(12) United States Patent
Ou

(10) Patent No.: US 11,729,340 B2
(45) Date of Patent: Aug. 15, 2023

(54) INFORMATION PROCESSING SERVER, METHOD, AND RECORDING MEDIUM

(71) Applicant: Sekin Ou, Tokyo (JP)

(72) Inventor: Sekin Ou, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/648,579

(22) Filed: Jan. 21, 2022

(65) Prior Publication Data

US 2022/0239801 A1   Jul. 28, 2022

(30) Foreign Application Priority Data

Jan. 25, 2021   (JP) ................................ 2021-009347

(51) Int. Cl.
*H04N 1/44*   (2006.01)
*G06F 3/12*   (2006.01)

(52) U.S. Cl.
CPC ........... *H04N 1/4433* (2013.01); *G06F 3/123* (2013.01); *G06F 3/1203* (2013.01)

(58) Field of Classification Search
CPC .................................................. H04N 1/4433
USPC ....................................................... 358/1.14
See application file for complete search history.

(56) References Cited

U.S. PATENT DOCUMENTS

| 2015/0263907 | A1 | 9/2015 | Negishi | |
| 2019/0251297 | A1* | 8/2019 | Khan | G06F 8/65 |
| 2019/0265963 | A1* | 8/2019 | Watanabe | G06F 8/65 |
| 2020/0409685 | A1* | 12/2020 | Shimomoto | G06Q 20/1235 |

FOREIGN PATENT DOCUMENTS

| JP | 2015-176502 | 10/2015 |
| JP | 2020-154862 | 9/2020 |
| WO | 2019/160786 | 8/2019 |

OTHER PUBLICATIONS

Extended European Search Report for 22152823.5 dated Jun. 21, 2022.

* cited by examiner

*Primary Examiner* — Jacky X Zheng
(74) *Attorney, Agent, or Firm* — IPUSA, PLLC

(57) ABSTRACT

An information processing server includes circuitry; and a memory storing computer-executable instructions that cause the circuitry to execute disabling use of a function provided by firmware, in response to acquiring a report indicating that the firmware is installed in an information processing apparatus; and enabling use of the function, in response to acquiring a report indicating that an application configured to use the function is installed in the information processing apparatus.

5 Claims, 7 Drawing Sheets

1 INFORMATION PROCESSING SYSTEM

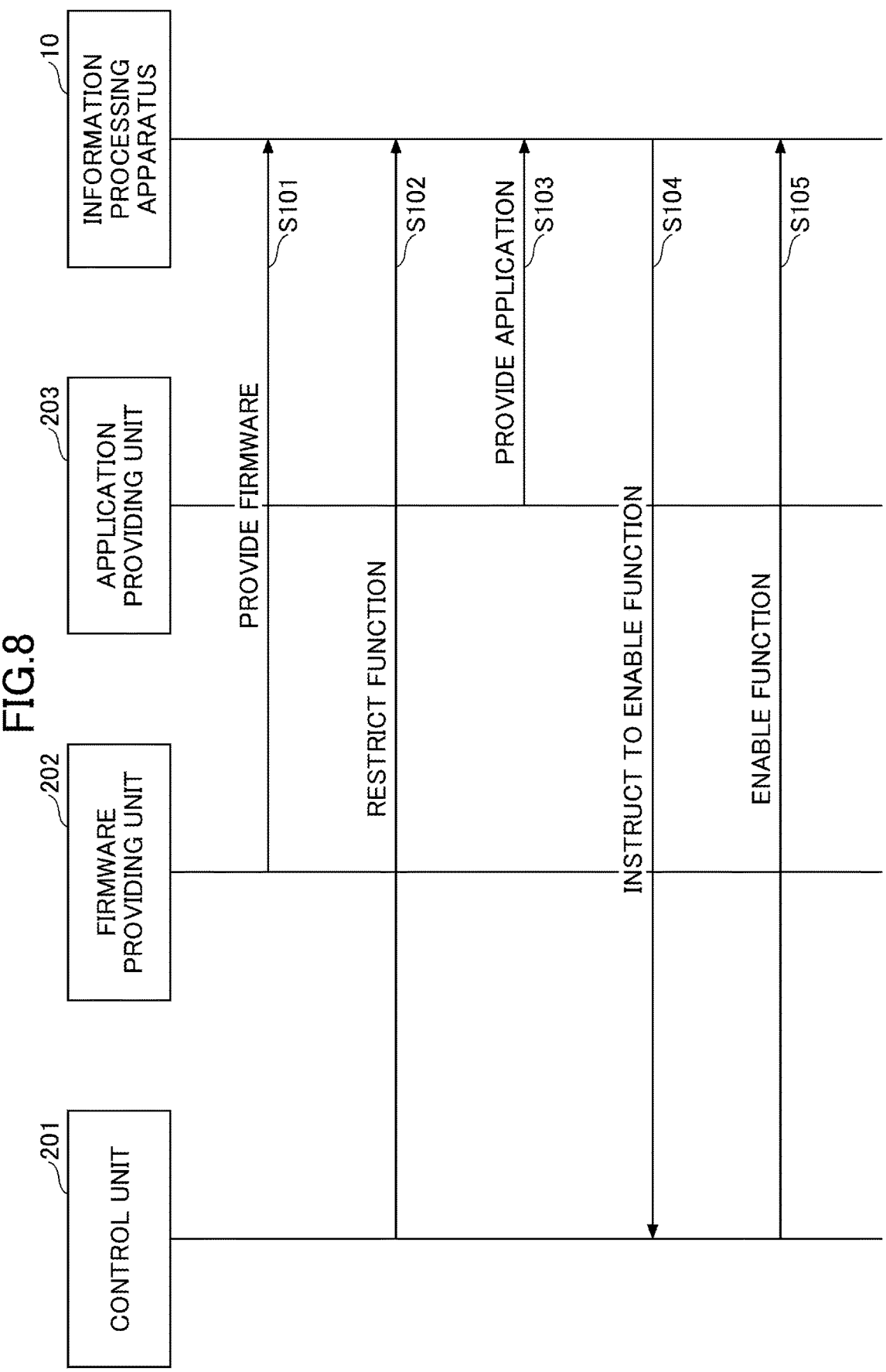

INFORMATION PROCESSING SERVER, METHOD, AND RECORDING MEDIUM

CROSS-REFERENCE TO RELATED APPLICATION

The present application is based on and claims priority under 35 U.S.C. § 119 to Japanese Patent Application No. 2021-009347, filed on Jan. 25, 2021, the contents of which are incorporated herein by reference in their entirety.

BACKGROUND OF THE INVENTION

1. Field of the Invention

The present invention relates to an information processing server, a method, and a recording medium.

2. Description of the Related Art

Conventionally, firmware is written in an information processing apparatus such as an image forming apparatus (for example, a multifunction peripheral/printer/product (MFP)). The firmware controls the hardware to provide various functions. The firmware is not only written in at the time of manufacturing the information processing apparatus; a new version of firmware can be downloaded and installed in the information processing apparatus. When the firmware is updated, the information processing apparatus can use a new function.

An application installed in the information processing apparatus uses a function of the firmware. That is, the application can use a function according to the version of the firmware.

Patent Document 1: Japanese Unexamined Patent Application Publication No. 2015-176502

SUMMARY OF THE INVENTION

According to one aspect of the present invention, there is provided an information processing server including circuitry; and a memory storing computer-executable instructions that cause the circuitry to execute disabling use of a function provided by firmware, in response to acquiring a report indicating that the firmware is installed in an information processing apparatus; and enabling use of the function, in response to acquiring a report indicating that an application configured to use the function is installed in the information processing apparatus.

BRIEF DESCRIPTION OF THE DRAWINGS

FIG. 8 is a sequence diagram illustrating a process flow of enabling a function of firmware according to an embodiment of the present invention.

DESCRIPTION OF THE EMBODIMENTS

Figure 1:
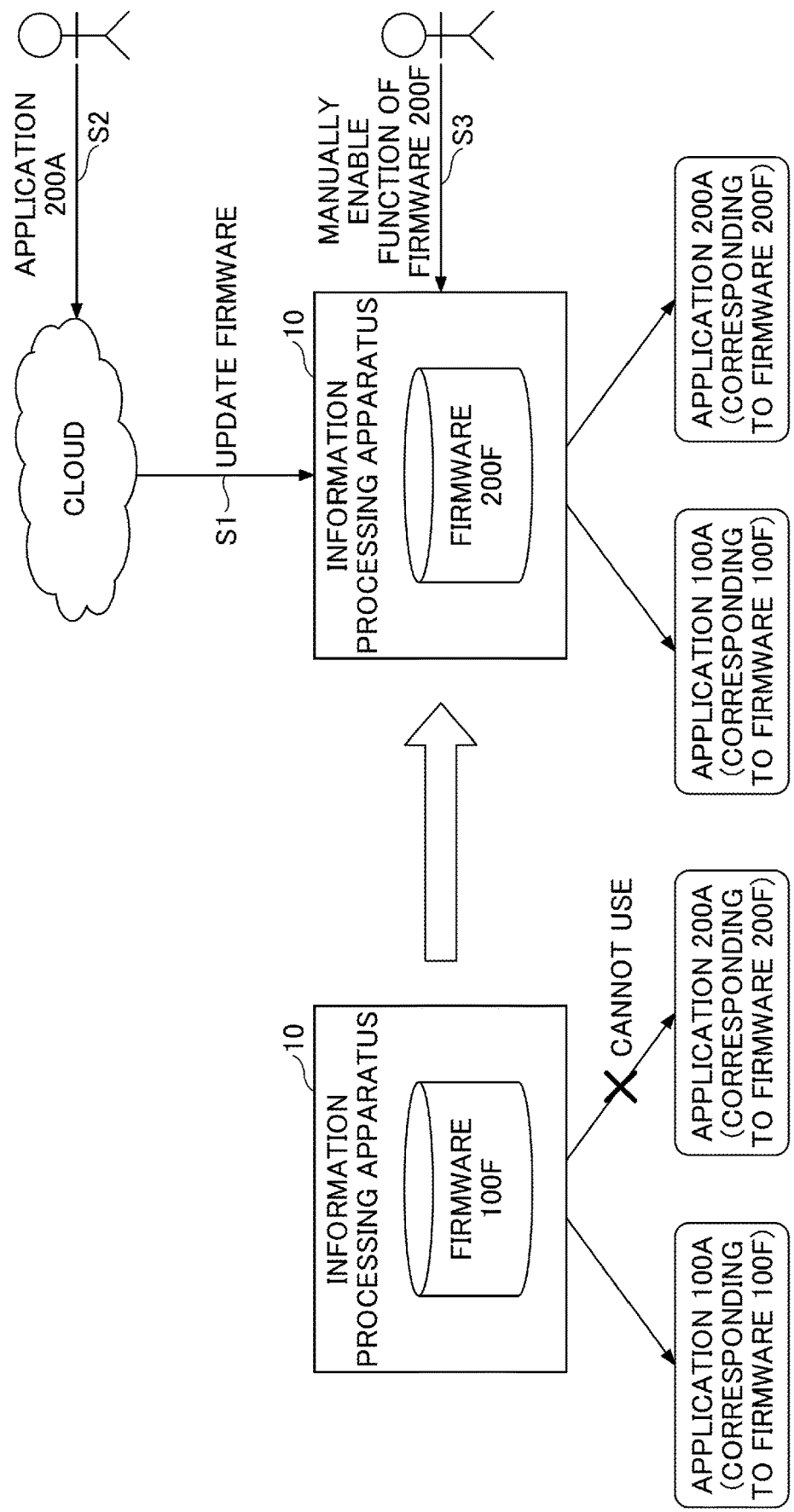
FIG. 1 is a diagram for explaining the enablement of a function of conventional firmware.

According to the conventional technique, a time lag may arise between the timing of writing in the firmware when manufacturing the information processing apparatus or the timing of updating the firmware, and the timing of releasing an application that uses the function provided by the firmware. In this case, even if the firmware is updated, it is desirable to disable the use of the function provided by the updated firmware, until the application that uses the function provided by the updated firmware is released.

A problem to be addressed by an embodiment of the present invention is to control the operation of the firmware of the information processing apparatus.

Hereinafter, each embodiment will be described with reference to the accompanying drawings. In the present specification and the drawings, the elements having substantially the same functional configuration are denoted by the same reference numeral and overlapping descriptions are omitted.

<Description of Terms>

"Firmware" is installed in an information processing apparatus (e.g., the main unit of an MFP). The firmware controls the hardware to provide various functions.

An "application" is installed in an information processing apparatus (e.g., the operation unit of an MFP). An application uses the function provided by the firmware.

Figure 2:
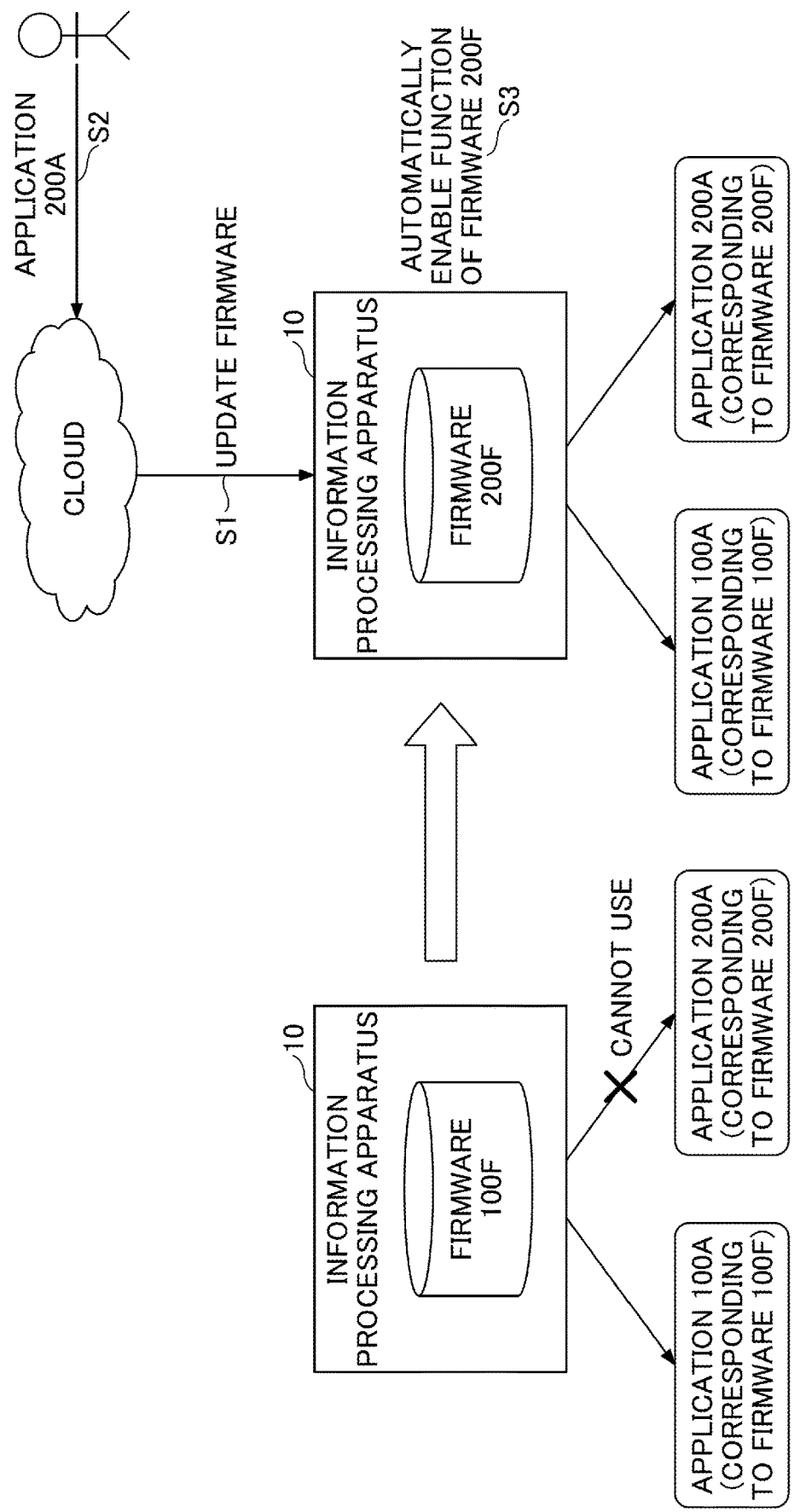
FIG. 2 is a diagram for explaining the enablement of a function of firmware according to an embodiment of the present invention.

Referring to FIGS. 1 and 2, a comparison is made between enabling the function of conventional firmware and enabling the function of firmware according to one embodiment of the present invention. It is assumed that that firmware 100F is installed in an information processing apparatus 10 (for example, an image forming apparatus such as an MFP). At this time, in the information processing apparatus 10, it is possible to use an application 100A corresponding to the firmware 100F, but it is not possible to use an application 200A corresponding to firmware 200F.

FIG. 1 is a diagram for explaining the enablement of a function of conventional firmware.

In step 1 (S1), it is assumed that the firmware of the information processing apparatus 10 is updated (for example, the version of the firmware is upgraded from the firmware 100F to the firmware 200F). At this point, the function provided by firmware 200F is not available for use.

In step 2 (S2), it is assumed that the application 200A corresponding to the firmware 200F (that is, the application that uses the function provided by firmware 200F) is released. The information processing apparatus 10 downloads and installs the application 200A.

In step 3 (S3), the function provided by firmware 200F is enabled manually (i.e., use is enabled). Therefore, the application 200A corresponding to the firmware 200F can be used.

FIG. 2 is a diagram for explaining the enablement of a function of firmware according to an embodiment of the present invention.

Steps S1 and S2 are similar to those of the conventional method of FIG. 1, and, therefore, descriptions thereof are omitted.

In step 3 (S3), the function provided by firmware 200F is automatically enabled (i.e., use is enabled). Therefore, the application 200A corresponding to the firmware 200F can be used.

<System Configuration>

Figure 3:
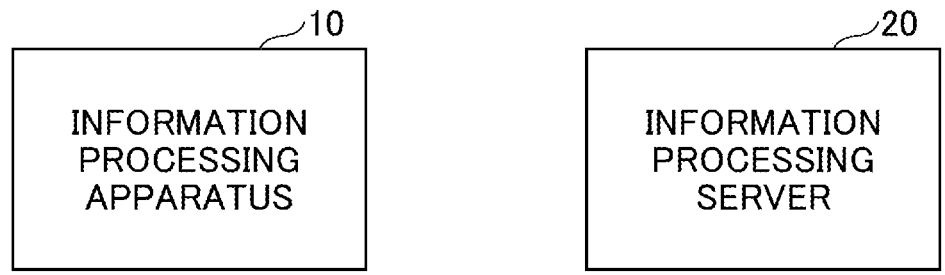
FIG. 3 is a schematic diagram illustrating the overall configuration of an information processing system according to an embodiment of the present invention.

FIG. 3 is a diagram illustrating the overall configuration of an information processing system 1 according to an embodiment of the present invention. As illustrated in FIG. 3, the information processing system 1 includes the information processing apparatus 10 and an information processing server 20. The information processing apparatus 10 and the information processing server 20 can transmit and receive data with each other via any network. Each of these apparatuses will be described below.

The information processing apparatus 10 is, for example, an image forming apparatus such as an MFP. Firmware is installed in the information processing apparatus 10 (e.g., the main unit of the MFP). An application is installed in the information processing apparatus 10 (for example, the operation unit of the MFP). The application can use the function provided by the firmware.

The information processing apparatus 10 is not limited to an image forming apparatus such as an MFP as long as a communication function is included. The information processing apparatus 10 may be, for example, a Projector (PJ), an Interactive White Board (IWB; an electronic blackboard capable of mutual communication), an output device such as a digital signage, a Head Up Display (HUD) device, an industrial machine, an imaging device, a sound collector, a medical device, a network home appliance, a connected car, a notebook personal computer (PC), a mobile phone, a smartphone, a tablet terminal, a game machine, a Personal Digital Assistant (PDA), a digital camera, a wearable PC, a desktop PC, or the like.

The information processing server 20 is a server that controls the operations of the firmware installed in the information processing apparatus 10. In response to the information processing server 20 receiving a report indicating that the firmware has been installed in the information processing apparatus 10, the information processing server 20 disables the use of the function provided by the firmware. In response to the information processing server 20 receiving a report indicating that an application that uses the function provided by the firmware has been installed in the information processing apparatus 10, the information processing server 20 enables the use of the function provided by the firmware.

Note that the group of apparatuses described in the examples are merely indicative of one of a plurality of computing environments for implementing the embodiments disclosed herein. In some embodiments, the information processing server 20 includes a plurality of computing devices such as a server cluster. The plurality of computing devices are configured to communicate with each other via any type of communication link, including a network, a shared memory, and the like, and perform the processes disclosed herein.

<Hardware Configuration of MFP>

Figure 4:
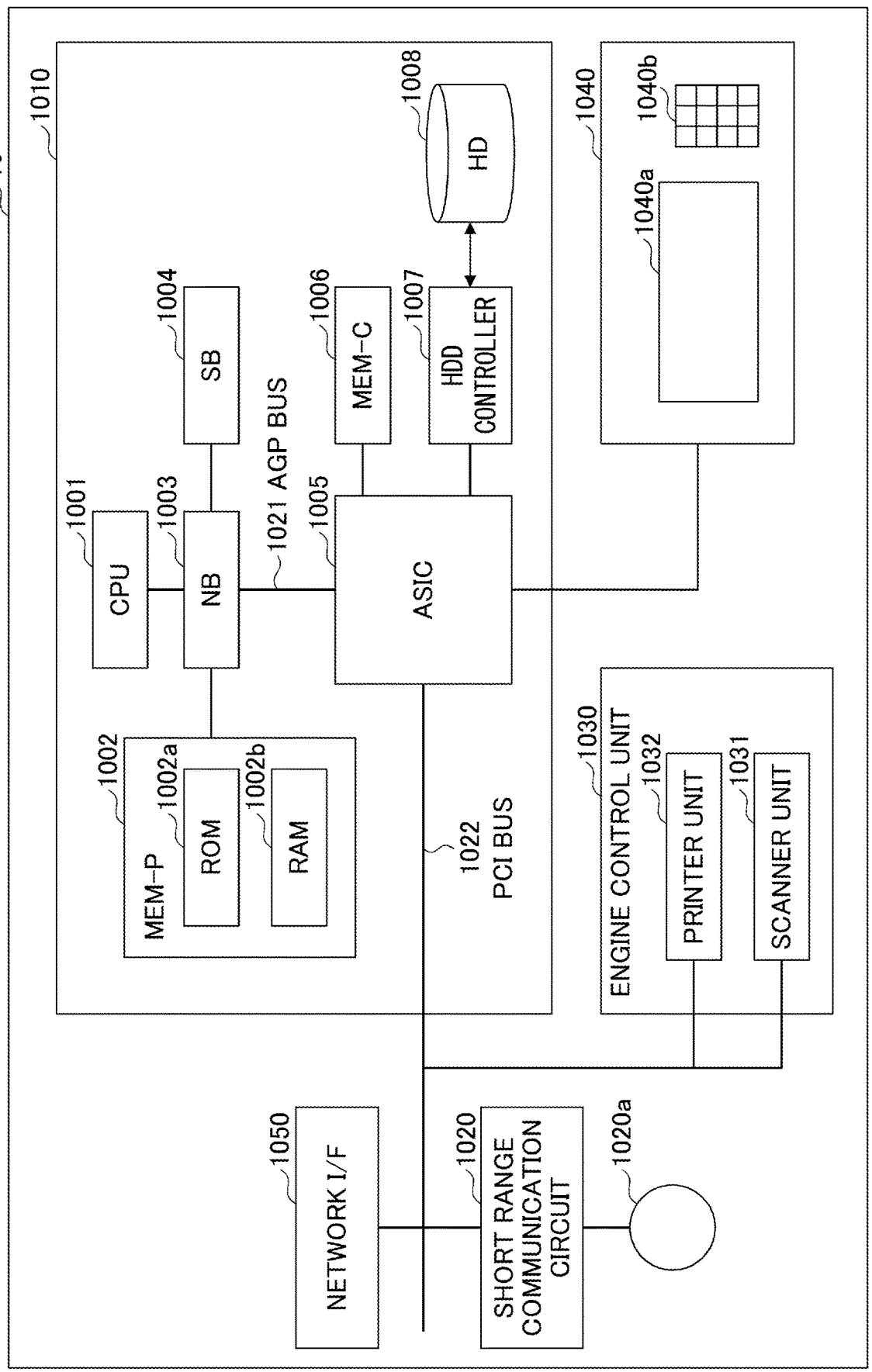
FIG. 4 is a diagram illustrating a hardware configuration of an information processing apparatus (in the case of an MFP) according to an embodiment of the present invention.

FIG. 4 is a diagram illustrating a hardware configuration of the information processing apparatus (in the case of an MFP) according to an embodiment of the present invention.

As illustrated in FIG. 4, the information processing apparatus 10 (in the case of an MFP) includes a controller 1010, a short range communication circuit 1020, an engine control unit 1030, an operation panel 1040, and a network interface (I/F) 1050.

Among these, the controller 1010 includes a central processing unit (CPU) 1001 that is the main part of the computer, a system memory (MEM-P) 1002, a north bridge (NB) 1003, a south bridge (SB) 1004, an Application Specific Integrated Circuit (ASIC) 1005, a local memory (MEM-C) 1006 that is a storage unit, a hard disk drive (HDD) controller 1007, and a hard disk (HD) 1008 that is a storage unit, and the NB 1003 and the ASIC 1005 are connected by an Accelerated Graphics Port (AGP) bus 1021.

Among these, the CPU 1001 is a control unit that controls the entire information processing apparatus 10 (in the case of an MFP). The NB 1003 is a bridge for connecting the CPU 1001, the MEM-P 1002, the SB 1004, and the AGP bus 1021, and includes a memory controller for controlling the reading and the writing from and to the MEM-P 1002, a Peripheral Component Interconnect (PCI) master, and an AGP target.

The MEM-P 1002 includes a read-only memory (ROM) 1002a, which is a memory for storing programs and data for implementing each function of the controller 1010, and a random access memory (RAM) 1002b, which is used for loading a program or data, and is used as a rendering memory at the time of memory printing, and the like. The program stored in the RAM 1002b may be configured to be provided by being recorded in a computer-readable recording medium such as a compact disc read-only memory (CD-ROM), a CD recordable (CD-R), a digital versatile disc (DVD) or the like, in a file in an installable format or an executable format.

The SB 1004 is a bridge for connecting the NB 1003 to Peripheral Component Interconnect (PCI) devices and peripheral devices. The ASIC 1005 is an integrated circuit (IC) for image processing applications including hardware elements for image processing, and has the role of a bridge connecting the AGP bus 1021, a PCI bus 1022, the HDD controller 1007, and the MEM-C 1006. The ASIC 1005 includes a PCI target and AGP master, an arbitrator (ARB) that forms the core of the ASIC 1005, a memory controller that controls the MEM-C 1006, a plurality of Direct Memory Access Controllers (DMACs) that rotate image data by hardware logic, and a PCI unit that performs data transfer between a scanner unit 1031 and a printer unit 1032 via the PCI bus 1022. The ASIC 1005 may be connected to an interface such as a Universal Serial Bus (USB) or an Institute of Electronic and Electronic Engineers 1394 (IEEE 1394).

The MEM-C 1006 is a local memory used as both an image buffer for copying and a code buffer. The HD 1008 is a storage for storing image data, storing font data used for printing, and storing forms. The HD 1008 controls the reading and the writing of data from and to the HD 1008 according to the control by the CPU 1001. The AGP bus 1021 is a proposed bus interface for graphics accelerator cards to speed up graphics processing, and by directly accessing the MEM-P 1002 with high throughput, the graphics accelerator card can be made faster.

The short range communication circuit 1020 is provided with a short range communication circuit antenna 1020a. The short range communication circuit 1020 is a communication circuit such as that of Near Field Communication (NFC), Bluetooth, or the like.

Further, the engine control unit 1030 includes the scanner unit 1031 and the printer unit 1032. The operation panel 1040 includes a panel display unit 1040a, such as a touch panel, which displays a current setting value, a selection screen, or the like, and receives input from an operator; and an operation panel 1040*b*, such as a numeric pad for receiving a setting value of an image forming condition, such as a density setting condition, a start key for receiving a copy start instruction, and the like. The controller 1010 controls the entire information processing apparatus 10 (in the case of an MFP) and controls, for example, rendering, communication, input from the operation panel 1040, and the like. The scanner unit 1031 or the printer unit 1032 includes an image processing unit that performs processes such as error diffusion or gamma conversion.

The information processing apparatus 10 (in the case of an MFP) can sequentially switch between functions and select a function, such as a document box function, a copy function, a printer function, and a facsimile function, by using an application switching key of the operation panel 1040. The document box mode is set when the document box function is selected, the copy mode is set when the copy function is selected, the printer mode is set when the printer function is selected, and the facsimile mode is set when the facsimile mode is selected.

The network I/F 1050 is an interface for performing data communication by using a communication network. The short range communication circuit 1020 and the network I/F 1050 are electrically connected to the ASIC 1005 via the PCI bus 1022.

<Hardware Configuration of Information Processing Server>

Figure 5:
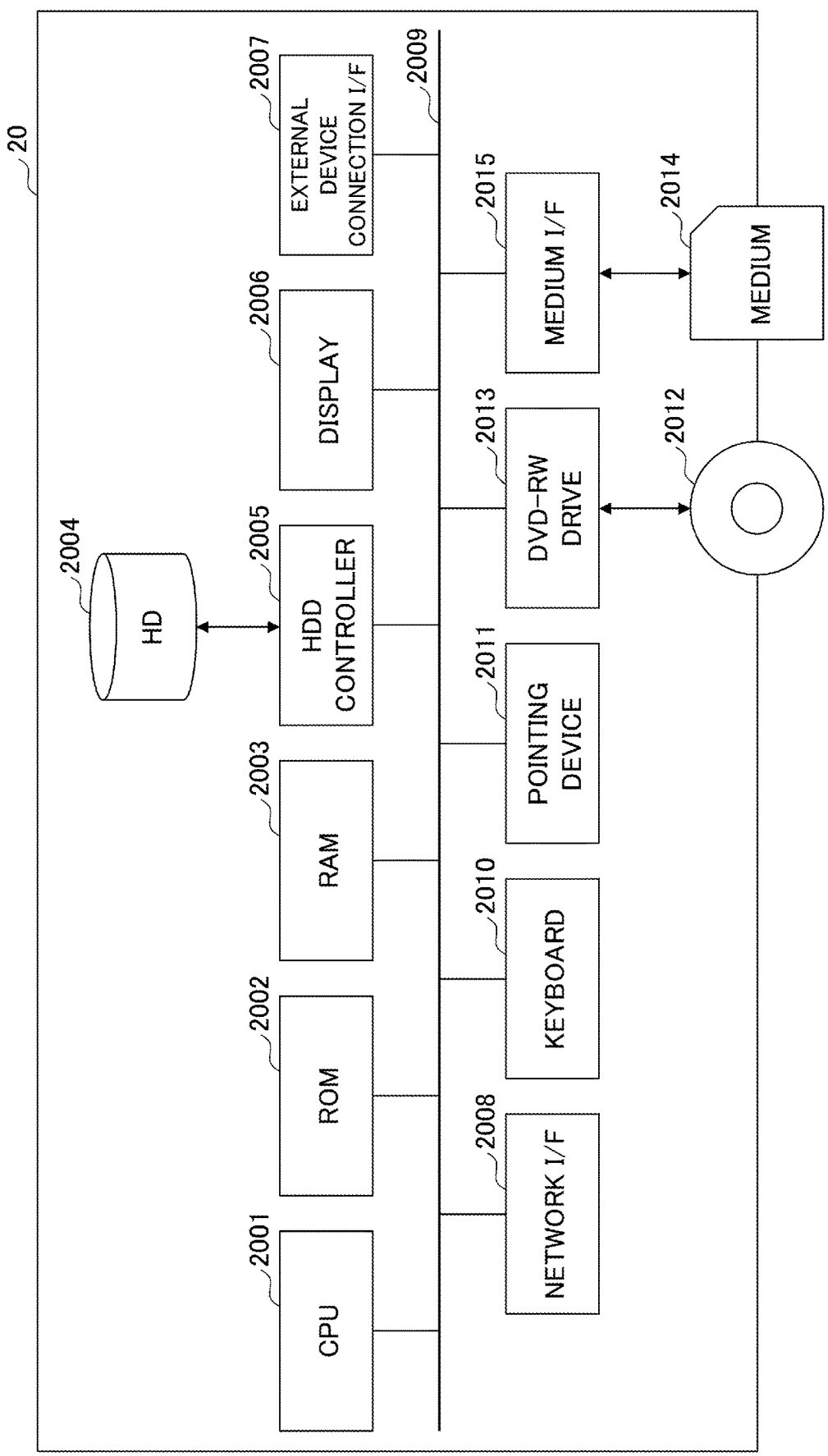
FIG. 5 is a diagram illustrating a hardware configuration of an information processing server according to an embodiment of the present invention.

FIG. 5 is a diagram illustrating a hardware configuration of the information processing server 20 according to an embodiment of the present invention.

As illustrated in FIG. 5, the information processing server 20 is constructed by a computer and includes a CPU 2001, a ROM 2002, a RAM 2003, an HD 2004, an HDD controller 2005, a display 2006, an external device connection I/F 2007, a network I/F 2008, a data bus 2009, a keyboard 2010, a pointing device 2011, a Digital Versatile Disc Rewritable (DVD-RW) drive 2013, and a medium I/F 2015.

Among these, the CPU 2001 controls the operation of the entire information processing server 20. The ROM 2002 stores the program used to drive the CPU 2001, such as an Initial Program Loader (IPL). The RAM 2003 is used as the work area of the CPU 2001. The HD 2004 stores various kinds of data such as programs. The HDD controller 2005 controls the reading and writing of various kinds of data from and to the HD 2004 in accordance with the control by the CPU 2001. The display 2006 displays various kinds of information such as cursors, menus, windows, characters, images, or the like. The external device connection I/F 2007 is an interface for connecting various external devices. In this case, the external device may be, for example, a USB memory or a printer. The network I/F 2008 is an interface for performing data communication by using a communication network. The data bus 2009 is an address bus, a data bus, or the like for electrically connecting the elements such as the CPU 2001 illustrated in FIG. 5.

The keyboard 2010 is a type of input means having a plurality of keys for inputting characters, numerical values, various instructions, and the like. The pointing device 2011 is a type of input means for selecting and executing various instructions, selecting a processing target, moving a cursor, and the like. The DVD-RW drive 2013 controls the reading and writing of various kinds of data from and to the DVD-RW 2012 that is an example of a removable recording medium. The recording medium is not limited to a DVD-RW, but may be Digital Versatile Disc Recordable (DVD-R) or the like. The medium I/F 2015 controls the reading and writing (storage) of data from and to a recording medium 2014, such as flash memory.

<Functional Block of the Information Processing Apparatus 10>

Figure 6:
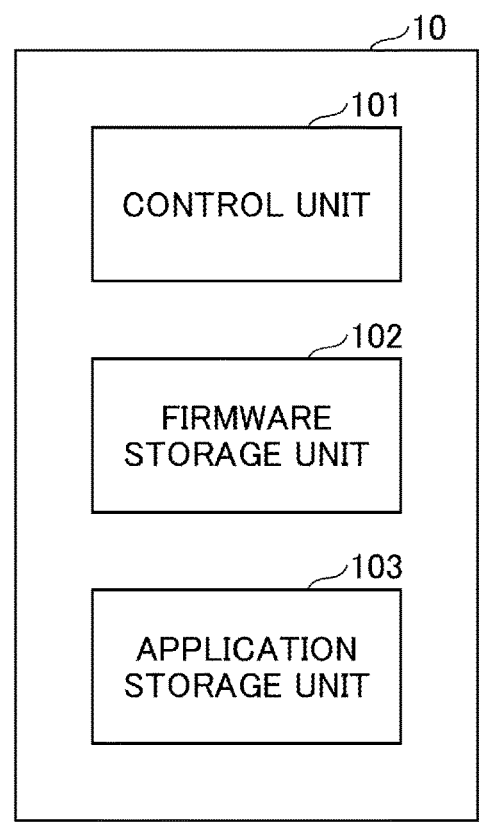
FIG. 6 is a diagram illustrating a functional block of an information processing apparatus according to an embodiment of the present invention.

FIG. 6 is a diagram illustrating a functional block of the information processing apparatus 10 according to an embodiment of the present invention.

The information processing apparatus 10 includes a control unit 101, a firmware storage unit 102, and an application storage unit 103. The information processing apparatus 10 functions as the control unit 101 by executing a program.

The control unit 101 transmits a report indicating that firmware has been installed in the information processing apparatus 10, to the information processing server 20. The control unit 101 transmits a report indicating that an application that uses a function provided by the firmware, has been installed in the information processing apparatus 10, to the information processing server 20.

The firmware storage unit 102 stores firmware.

The application storage unit 103 stores an application.

<Function Block of the Information Processing Server 20>

Figure 7:
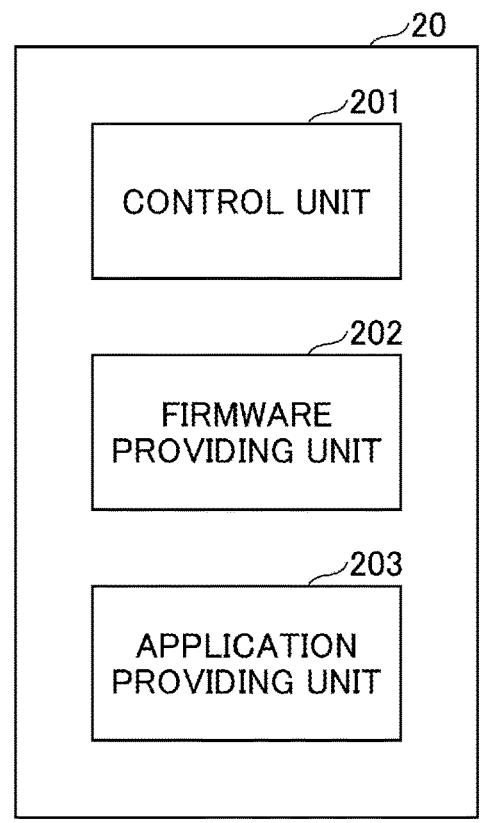
FIG. 7 is a diagram illustrating a functional block of an information processing server according to an embodiment of the present invention.

FIG. 7 is a diagram illustrating a functional block of an information processing server 20 according to an embodiment of the present invention.

The information processing server 20 includes a control unit 201, a firmware providing unit 202, and an application providing unit 203. The information processing server 20 functions as the control unit 201, the firmware providing unit 202, and the application providing unit 203 by executing a program.

When a report indicating that firmware has been installed in the information processing apparatus 10 is acquired, the control unit 201 disables use of the function provided by the firmware of the information processing apparatus 10. When the control unit 201 acquires a report indicating that an application that uses the function provided by the firmware, has been installed in the information processing apparatus 10, the control unit 201 enables use of the function provided by the firmware of the information processing apparatus 10.

The firmware providing unit 202 provides the firmware to the information processing apparatus 10.

The application providing unit 203 provides the application to the information processing apparatus 10.

<Processing Method>

FIG. 8 is a sequence diagram illustrating a process flow of enabling a function of firmware according to an embodiment of the present invention.

In step 101 (S101), the firmware providing unit 202 of the information processing server 20 provides firmware to the information processing apparatus 10. Specifically, the information processing apparatus 10 downloads the firmware from the information processing server 20 and installs the firmware in the information processing apparatus 10 (for example, the main unit of the MFP). The firmware may be written in at the time of manufacturing of the information processing apparatus 10.

In step 102 (S102), the control unit 201 of the information processing server 20 restricts (i.e., disables the use of) the function provided by the firmware of the information processing apparatus 10. Specifically, in response to the control unit 201 acquiring a report indicating that the firmware has been installed in the information processing apparatus 10 from the information processing apparatus 10, the control unit 201 disables the use of the function provided by the firmware of the information processing apparatus 10.

In step 103 (S103), the application providing unit 203 of the information processing server 20 provides an application to the information processing apparatus 10. Specifically, the information processing apparatus 10 downloads the application from the information processing server 20 and installs the application in the information processing apparatus 10 (for example, an operation unit of an MFP).

In step 104 (S104), the control unit 101 of the information processing apparatus 10 transmits a report indicating that an application that uses the function provided by the firmware of S101 has been installed in the information processing apparatus 10, to the information processing server 20.

In step 105 (S105), when the report of S104 is acquired, the control unit 201 of the information processing server 20 enables (i.e., enables the use of) a function provided by the firmware of the information processing apparatus 10. For example, when the report of S104 is acquired, the control unit 201 enables the use of the function to be used by the application of S103, among the functions provided by the firmware. Therefore, the application of S103 can be used.

<Effect>

As described above, in one embodiment of the present invention, it is possible to disable the use of the function of the firmware that is already installed in the information processing apparatus, until the application is installed in the information processing apparatus.

The functions of the embodiment described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, the operation of firmware of an information processing apparatus is controlled.

The information processing server, the method, and the recording medium are not limited to the specific embodiments described in the detailed description, and variations and modifications may be made without departing from the spirit and scope of the present invention.

What is claimed is:

1. An information processing server comprising:
   circuitry; and
   a memory storing computer-executable instructions that cause the circuitry to:
   control an information processing apparatus such that the information processing apparatus cannot use a function provided by firmware, in response to acquiring, from the information processing apparatus, a first report indicating that the firmware is installed in the information processing apparatus; and
   control the information processing apparatus such that the information processing apparatus can use the function, in response to acquiring, from the information processing apparatus, a second report indicating that an application configured to use the function is installed in the information processing apparatus.

2. The information processing server according to claim 1, wherein the circuitry is further caused to:
   control the information processing apparatus such that the information processing apparatus can use the function to be used by the application, among one or more functions provided by the firmware.

3. The information processing server according to claim 1, wherein the firmware is installed in the information processing apparatus when the information processing apparatus is manufactured or when the firmware is to be updated to a new version.

4. A method performed by an information processing server, the method comprising:
   controlling an information processing apparatus such that the information processing apparatus cannot use a function provided by firmware, in response to acquiring, from the information processing apparatus, a first report indicating that the firmware is installed in the information processing apparatus; and
   controlling the information processing apparatus such that the information processing apparatus can use the function, in response to acquiring, from the information processing apparatus, a second report indicating that an application configured to use the function is installed in the information processing apparatus.

5. A non-transitory computer-readable recording medium storing a program that causes a computer to execute a process performed in an information processing server, the process comprising:
   controlling an information processing apparatus such that the information processing apparatus cannot use a function provided by firmware, in response to acquiring, from the information processing apparatus, a first report indicating that the firmware is installed in the information processing apparatus; and
   controlling the information processing apparatus such that the information processing apparatus can use the function, in response to acquiring, from the information processing apparatus, a second report indicating that an application configured to use the function is installed in the information processing apparatus.

* * * * *